Nov. 5, 1963    R. DEFLANDRE    3,109,514
SYSTEM FOR LUBRICATION OF MACHINE COMPONENTS
Filed May 11, 1961    9 Sheets-Sheet 1

Fig. 18

United States Patent Office 3,109,514
Patented Nov. 5, 1963

3,109,514
SYSTEM FOR LUBRICATION OF MACHINE COMPONENTS
René Deflandre, Paris, France, assignor to Société dite: Derefa, Etablissement pour le Développement, Recherches et Fabrications Industrielles, Vaduz, Liechtenstein
Filed May 11, 1961, Ser. No. 109,413
Claims priority, application France May 23, 1960
19 Claims. (Cl. 184—5)

This invention relates to the pressure lubrication of relatively displaceable machine components, and more especially though not exclusively to the pressure lubrication of slideways in machine-tools.

In most present-day machine-tools of large size the slideway surfaces provided between adjacent relatively displaceable components, e.g. slides, of the machine are lubricated under pressure to prevent positively any metal-to-metal contact between the sliding surfaces and thus permit smooth and continuous relative displacements even at very low speeds as is required to provide the desired high degree of accuracy, to within the order of a micron, in the adjustment and operation of the machine. The lubricant liquid is delivered in between the mating slideway surfaces through lubricator inlets and is there distributed e.g. through grooves or recesses in said surfaces so as to provide a continuous and permanent film of lubricant between said surfaces and ensure retention of such film in the absence of relative displacement between the parts. To adjust the thickness of the lubricant film to a predetermined value, usually of the order of about $\frac{1}{100}$ millimeter, the oil delivery pressure is adjusted to a suitable value depending on the surface area of the slide surfaces and also on the load applied thereto.

In most cases the load is applied to a slideway at a point displaced from the geometrical center of the slideway. It is customary, accordingly, to provide two or more spaced lubricator inlets delivering oil to appropriately selected spaced areas of the slideway, and the pressures of oil delivery to the respective inlets is adjusted to different values so selected as to offset the unbalance in load distribution throughout the slideway and create equal resultants between the reactions to the applied load on the one hand and the forces of oil pressure on the other, whereby a substantially uniform oil film can be maintained throughout the slideway area.

It is clear however that the desirable condition thus obtained will not persist should the value of the load applied to the slideway or the point of application of the load, vary during the use of the machine. A variation in load application point may occur in a machine-tool, due to the displacement of a heavy slide, head or other component of the machine in a horizontal direction along its slideways, whereby the point of application of the load exerted by said displaced slide upon its slideways as well as upon all other slideways of the machine components supporting said slide, will be shifted. Similarly, a variation in load value may be due for example to some auxiliary machine-tool attachment being fitted to the original head or slide thereby increasing its weight.

In case of any such variation in load value or application point, the load reactions in the various areas of some or all of the slideways of the machine will be altered, departing from the originally present conditions and the lubricant film may well break down in the more heavily load areas with serious consequences on machine performance and accuracy.

It is an object of this invention to provide a pressure lubricating system which will operate to maintain preselected uniform lubricant film thickness throughout the full area of a slideway surface regardless of alterations in loading during operation and use of the machine. A broad object in connection with machine tool applications is to improve the smoothness of slide displacements especially at low speeds and consequent machining precision. The above and further objects will appear as the disclosure proceeds.

In one important aspect the invention contemplates in a machine having a plurality of relatively displaceable machine components and interengaging slideway surfaces on adjacent ones of said components, the distribution of loads on at least one of the slideway surfaces being variable with the relatively displaced position of at least one of said components, the provision of spaced lubricator inlets delivering pressure lubricant to said one slideway surface, valve means for separately controlling the flow of lubricant to the respective inlets, and valve adjusting means connected to said one component and responsive to the displaced position thereof for adjusting said valve means so as separately to vary the flow of lubricant to the respective inlets and thereby substantially to offset the variations in load distribution on said one slideway surface.

An examplary embodiment of the invention will now be described without limitative intent with reference to the accompanying drawings, wherein:

FIGURES 9 to 12 illustrate in elevation a vertical milling and boring machine equipped with the improved means of the invention and in various operating conditions, together with graphic representations of the reaction forces created on the various slideways.

Figure 1:
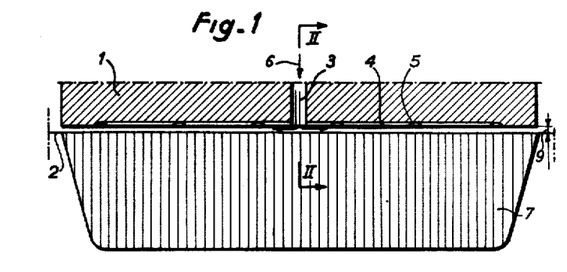
FIGURE 1 is a schematic view in section showing a slideway having a single central lubricator inlet and shows the pressure distribution diagram in the case the slideway is centrally loaded.
Figure 2:
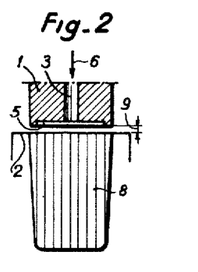
FIGURE 2 is a section on line II—II of FIGURE 1.
Figure 3:
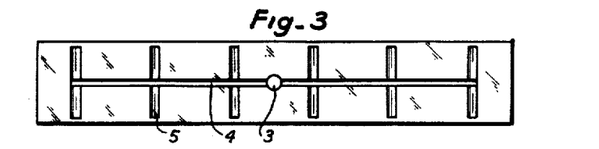
FIGURE 3 is a plan view of FIGURE 1.

Referring first to FIGURES 1, 2 and 3, there is schematically a machine-tool slide 1 movable over an underlying bed surface 2. An oil inlet for delivering pressure oil into the space between the mating surfaces of the slide and bed is provided by an inlet duct 3 formed through the slide 1 centrally thereof. A longitudinal groove or duct 4 formed in the under surface of the slide 1 distributes the oil delivered through inlet 3 to a plurality of transverse recesses 5 in the under surface of the slide. Assuming the slide 1 is loaded in balanced condition so that the resultant 6 of the load is positioned as shown at the centre of the slide, the oil pressure is distributed equally throughout substantially the full area of the mating surfaces of 1 and 2 as indicated by the cross-hatched areas 7 and 8 in FIGURES 1 and 2. The slide 1 is lifted off from the bed surface 2 while remaining parallel to said surface, by a vertical distance 9 which can be adjusted to a desired value, say 1/100 mm.

Figure 4:
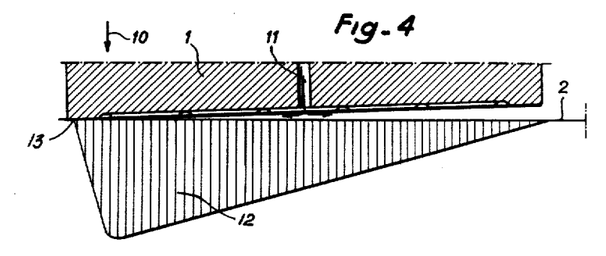
FIGURE 4 shows the same slideway with the pressure diagram obtaining when the point of load application is off center.

Should however a condition arise in the use of the machine in which the resultant load applied to the slide 1 is off centre as indicated at 10 in FIGURE 4, the pressures in the oil film are unequally distributed as indicated for example by the area 12, and the slide 1 is tilted relatively to the bed. In the illustrated condition metal-to-metal contact is established at 13 between the mating surfaces, undesirable friction occurs and the accuracy and general performance of the machine are seriously impaired.

Figure 5:
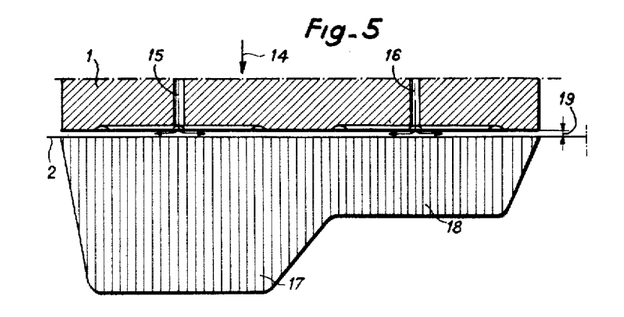
FIGURE 5 shows a slideway provided with two spaced lubricator inlets and the pressure diagram obtainable in case of an off-center load in order to offset the load unbalance.

In the further diagram of FIGURE 5 it is again assumed that the slide 1 is subjected to an off-center load 14. However the slide 1 is here shown provided with two spaced oil inlets 15 and 16 together with means, not shown, for separately adjusting the oil pressure delivered through the two inlets. The oil delivery pressure through the respective inlets can now be adjusted to different values, as indicated by the two stepped portions 17 and 18 of the corresponding pressure curve, such as to offset the increased load tending to apply the left hand end of the slide against the table; as a result the slide 1 will therefore be raised off the table surface in a parallel horizontal condition, by a uniform vertical distance 19 which again can be adjusted to a desired value, say 1/100 mm., by suitable tests and adjustments.

Figure 6:
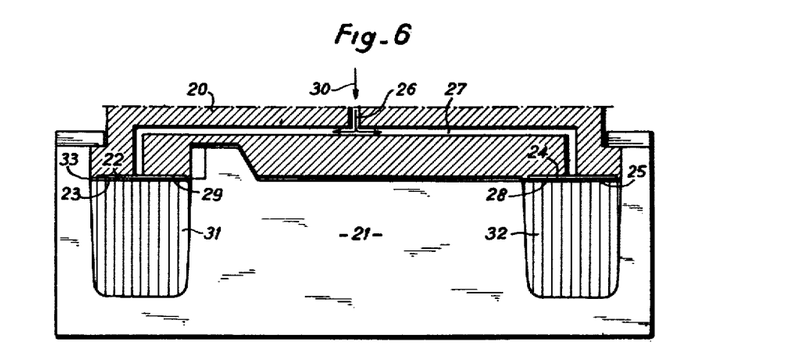
FIGURE 6 similarly illustrates a pair of transversely spaced slideways with a common lubricator inlet and the pressure diagram obtaining with a centered load.

FIGURE 6 illustrates a different type of slide or movable carriage 20 movable over a bench 21, by means of a pair of spaced slideway surfaces 22—23 and 24—25. Oil is first assumed to be delivered for lubrication of both slideways through a common oil inlet 26 and a duct 27 discharging into recesses 28, 29 similar to the recesses 5 in FIGURES 1, 2 and 3 and provided in the respective slideway surfaces of the slide 1. If the resultant load 30 is applied centrally as in FIGURE 6, the pressures are equally distributed as between both ways 22—23 and 24—25 and the resulting pressure diagrams will be substantially as shown at 31 and 32. The slide 1 as a whole is raised in parallel condition by the oil pressure, by a vertical distance 33 which again can be adjusted to a desired value.

Figure 7:
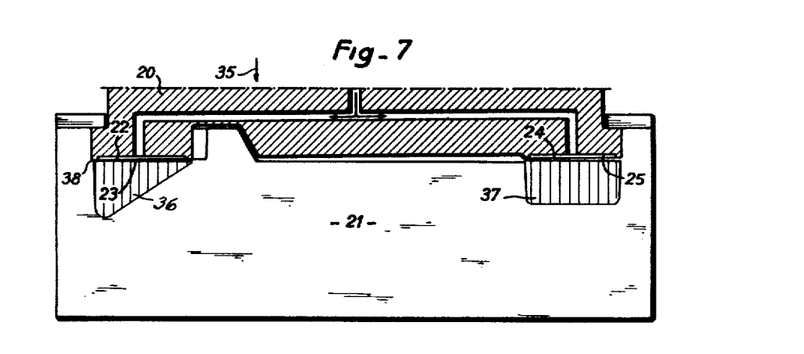
FIGURE 7 shows the same slideway arrangement with the pressure diagram in case of an off-center load.

In FIGURE 7 it is assumed that the resultant load in the same system as in FIGURE 6 is applied off center as at 35. The pressures are now unequally distributed as shown by the pressure curves 36 and 37, and the slide 20 is tilted relative to bench 21. Metal to metal contact and friction may occur as at 38, impairing machine performance.

Figure 8:
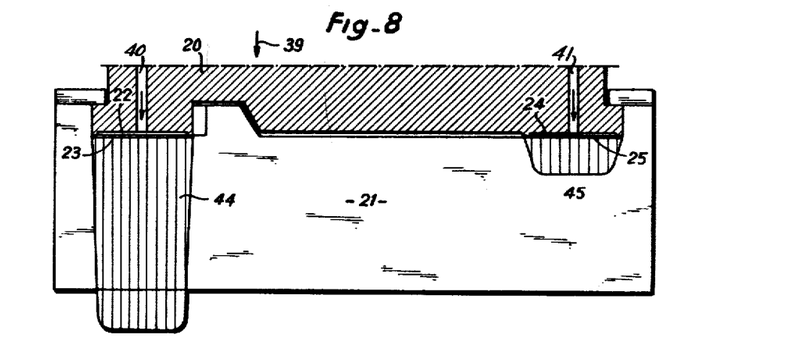
FIGURE 8 shows a pair of transversely spaced slideways with separate lubricator inlets and the pressure diagram then obtainable for offsetting the unbalance created by the off-center load.

In the system diagrammatically shown in FIGURE 8, the general arrangement is the same except that two separate oil inlets 40 and 41 are provided into the respective slideway surfaces, as well as means not shown for separately controlling the pressure of oil delivery thereinto. With this arrangement and by suitably adjusting the respective oil delivery pressures such that the oil pressure on way 22 nearer to the resultant load 39 is sufficiently greater than the oil pressure on the other way 24 to offset the unbalance in load (as indicated by pressure curves 44, 45), a balanced condition can again be obtained so that the vertical upward displacements at both spaced slideway surfaces are both equal to a predetermined value, and the slide as a whole is again in a horizontal, balanced position.

Figure 9:
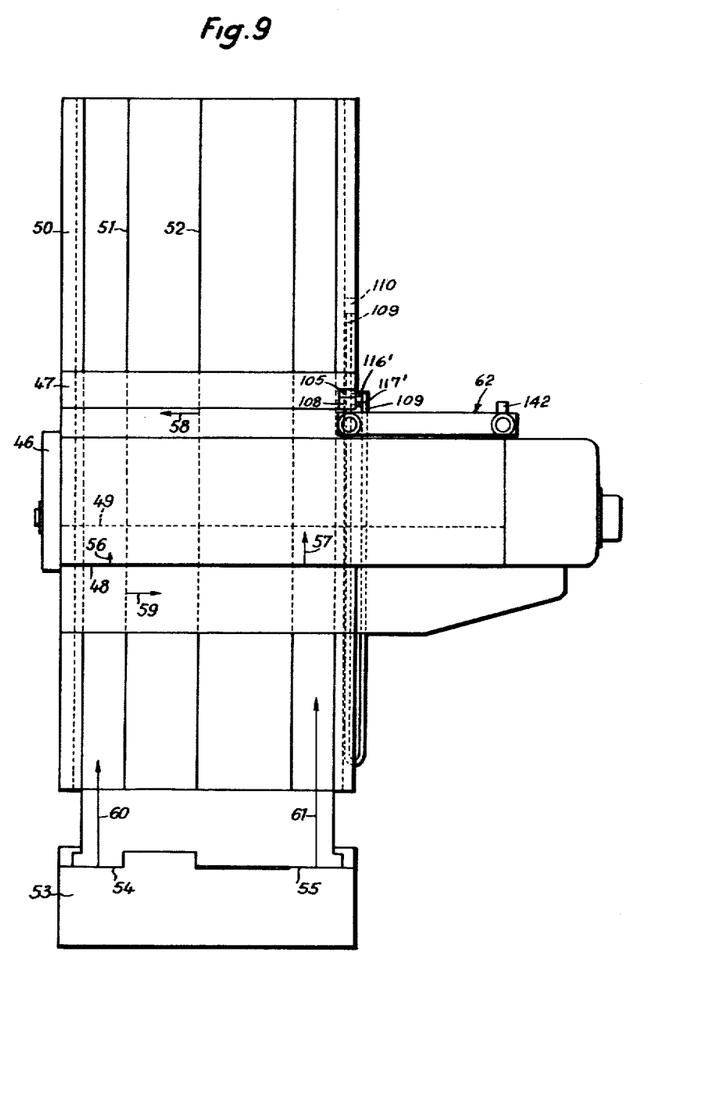
FIGURE 9 illustrates the retracted position of the milling and boring head.
Figure 10:
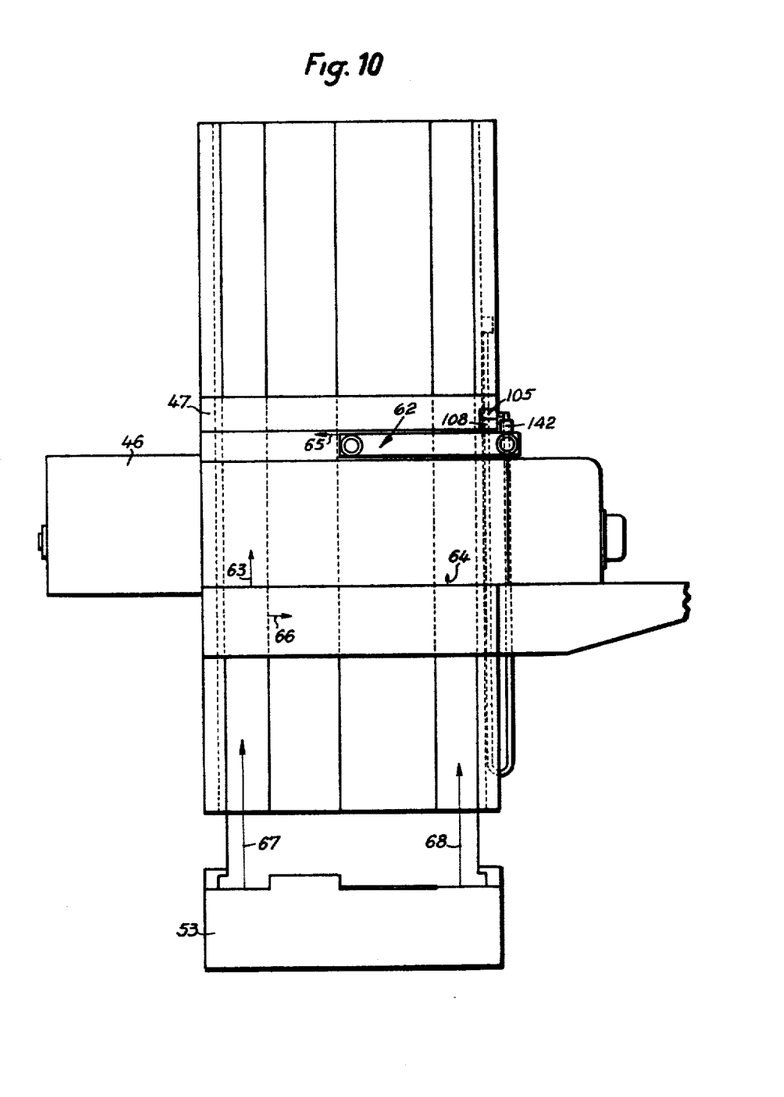
FIGURE 10 shows the extended position of the head.

FIGURE 9 illustrates in part a conventional milling and boring machine, including a slide 47 upon which a milling and boring head 46 is horizontally slidable longitudinally of the slide by way of slideways 48 and 49. Slide 47 in turn is vertically displaceable along a standard 50 on ways 51—52. The standard 50 is mounted on a bedplate 53 through two spaced slideways 54 and 55 for sliding displacement in a horizontal direction normal to the direction of displacement of the head 46 on slide 47. With the head 46 in the fully retracted position shown in FIGURE 9, the loads applied by the weight of the components 46, 47 and 50 produce the respective upwardly directed reaction forces at the oil inlets to the various bearing surfaces, as indicated by the arrows 56, 57, 58, 59, 60 and 61 respectively. However, when the head 46 is displaced to its fully extended position, as is shown in FIGURE 10, it is evident that owing to the horizontal displacement of the centre of gravity of the head the various loads and reactions applied to the bearing surfaces are not the same. The respective arrows shown in both FIGURES 9 and 10 are approximately proportional in length to the values of the reaction forces actually obtained with a specific embodiment of the machine described. It will be observed that reaction force 56 (FIGURE 9) has increased to force 63 (FIGURE 10), force 57 has diminished to force 64; force 58 has diminished to 65, force 59 has diminished to 66, force 60 has increased to 67 and force 61 has diminished to 68. Clearly for intermediate displaced positions of the head the various reaction forces shown will assume continuous ranges of intermediate values between those indicated in FIGURES 9 and 10.

Figure 11:
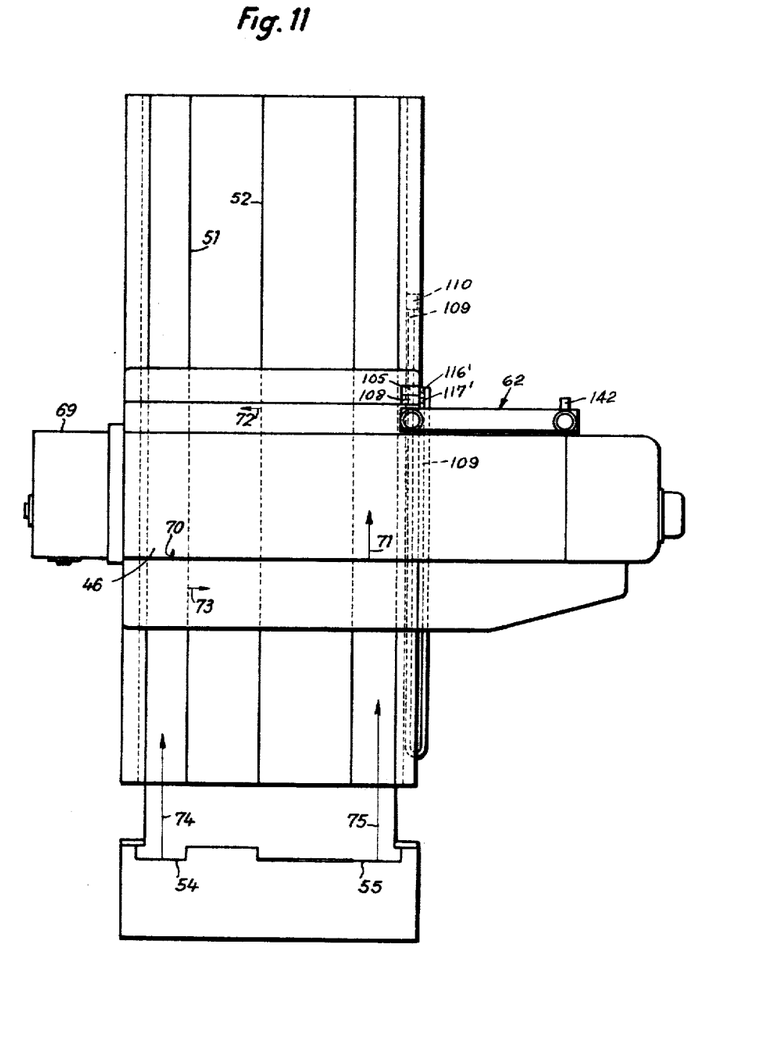
FIGURE 11 shows the head equipped with a vertical milling attachment, in the retracted condition of the head.
Figure 12:
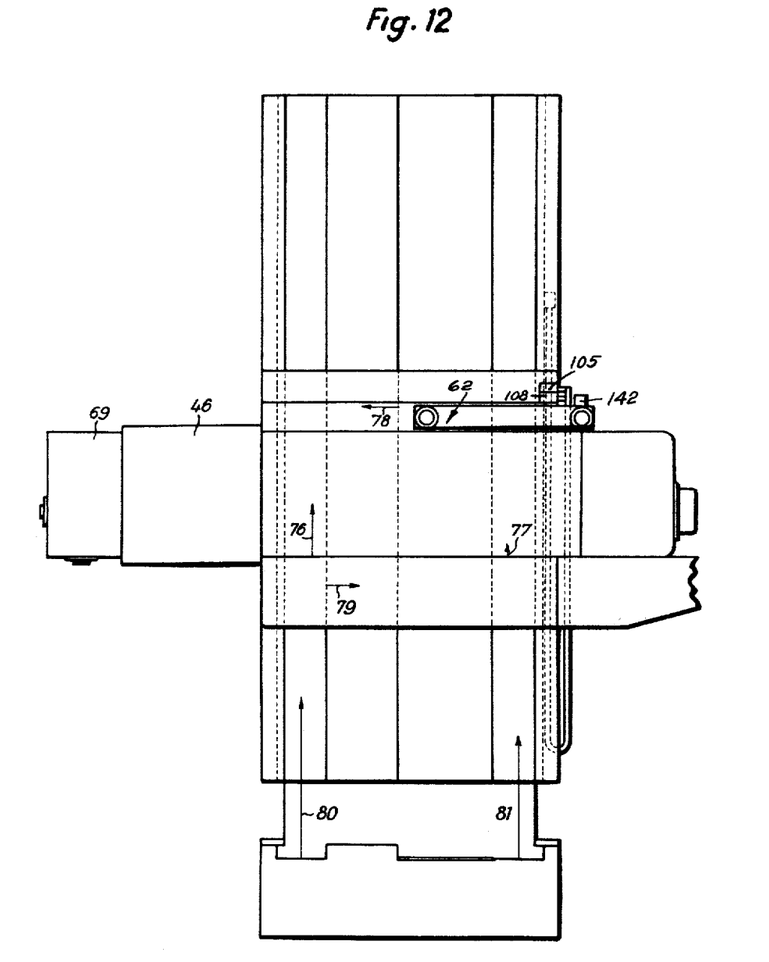
FIGURE 12 shows the head with the vertical attachment in the extended condition.
Figure 13:
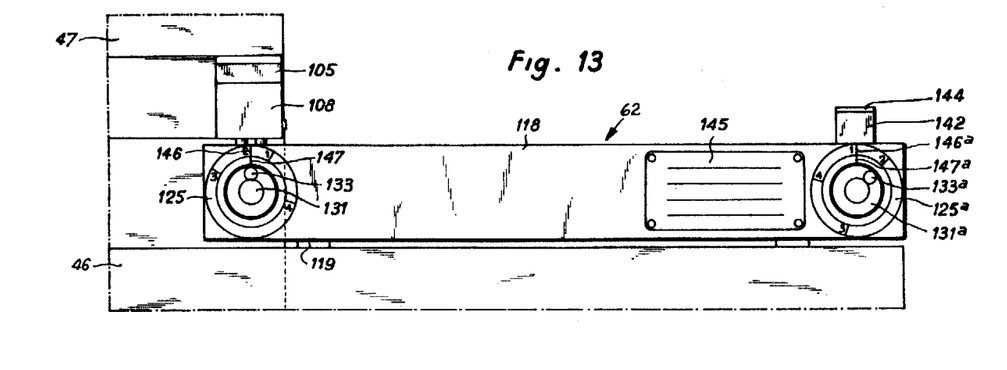
FIGURE 13 is a side elevational view of lubricating pressure regulating apparatus according to the invention similar to that usable in the machine shown in FIGURES 9 to 12.

FIGURES 11 and 12 illustrate the same general machine as in FIGURES 9 and 10 except that a vertical milling attachment 69 has been mounted upon the head 46. In the retracted position of head 46 shown in FIGURE 11, it will be seen that the reaction forces shown at 70, 71, 72, 73, 74 and 75 have assumed different values from the values shown in FIGURE 9, the change being now due to the added weight of milling attachment 69. In FIGURE 12, the head 46 is shown fully extended (as in FIGURE 10) and the respective reactions 76, 77, 78, 79, 80 and 81 are again seen to differ from the values in any of the conditions of the machine considered so far.

Thus, owing to the variations in the reaction forces applied to the various bearings surfaces of the machine-tool such as the one shown in FIGURES 9–12, depending on the varying operating conditions, it has not been possible heretofore to maintain the respective relatively movable components of the machine in balanced, parallel conditions with uniform clearance between the interengaging bearing surfaces thereof; this has resulted in objectionable friction and poor machine performance. The problem is overcome by the invention in accordance with the teachings disclosed above by provision for automatically and separately regulating the lubricant pressure at various points of each of the slideways in dependency on the values of the reaction forces present at any time and at each point. An embodiment of such an automatic lubricant pressure regulator device, generally designated 62 in FIGURES 9–12, will now be described with reference to FIGURES 13 to 17.

Regulator unit 62 comprises a two-part valve housing

105—108 supported from the slide 47 (see e.g. FIGURES 13 and 15) containing six generally similar pressure control valves which as will be later described act to control the flow of lubricant oil from a pressure source to each of six oil inlet ducts provided in the respective slideways. Returning to FIGURE 9, it will be understood that considering for example the pair of spaced slideways 54 and 55 by which the standard 50 is slidable longitudinally of base 53, there are oil inlet ducts, not shown, corresponding to the inlets 40, 41 of FIGURE 8, leading thereto and connected with transverse recesses provided between the mating slideway surfaces as earlier described. The reaction forces on the slideways indicated by the arrows such as 60 and 61 in FIGURE 9 should be considered as applied at the said oil inlets. Similarly the vertical ways 51 and 52 have separate oil inlets formed in them at positions such as those indicated by the reaction forces 58 and 59; and the transverse horizontal ways 48 have separate oil inlets therein positioned as indicated by reaction forces 56 and 57. Each of the six separate oil inlets thus located are connected through suitable conduit means not shown with the six valves mounted in upper valve housing section 105 which valves serve to regulate the oil flow to said inlets in accordance with the loading conditions in the machine. For this purpose each of the six valves is actuated through means presently described by a related one of six camways or rails 102 extending in general parallel relation and supported from the machine-tool head 46 so as to be movable with respect to the valve housing 105 in accordance with the more or less fully extended position of head 46 relative to slide 47 carrying the valve housing.

Each of the six regulator valves in housing section 105 includes a valve member 101 (see FIGURES 15 and 15a) cooperating with a valve seat 104.

The position of valve member 101 relative to seat 104 controls the flow of lubricant oil from an inlet passage 116 connected with the pressure source to an outlet passage 117 connected to the particular one of the six slideway oil inlets associated with the valve assembly under consideration, as earlier described. The oil inlet and outlet passages 116, 117, respectively, are connected by ducts 116', 117', respectively, in FIG. 11, to a flexible tubing 109, which connects said passages to a source of supply, represented by the dotted rectangle 110, in said FIG. 11. Valve member 101 is urged to its seated position relative to seat 104 in which it blocks the flow between said passages 116—117 by a spring 106 acting between the valve member 101 and a plunger 107 which is axially slidable relative to the valve member. All the six plungers such as 107 are slidably mounted together with their related parts in the lower valve housing section 108. A set screw 111 threaded through the wall of housing section 108 engages at its end a longitudinal groove 112 formed in plunger 107 so as to block the plunger against rotation while enabling it to slide axially in the section 108. The lower end of plunger 107 projecting below housing section 108 carries a transverse pin 114 on which is pivoted a roller 115 which the spring 106 resiliently applies against the upper surface of the related rail 102.

Figure 14:
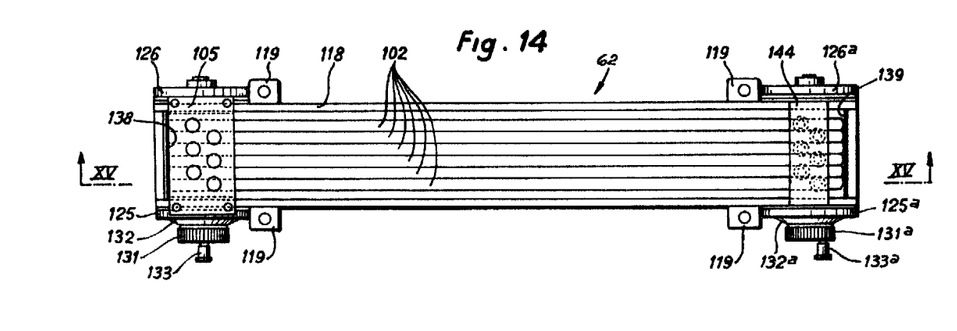
FIGURE 14 is a plan view corresponding to FIGURE 13.
Figures 15, 15A, 16, 17:
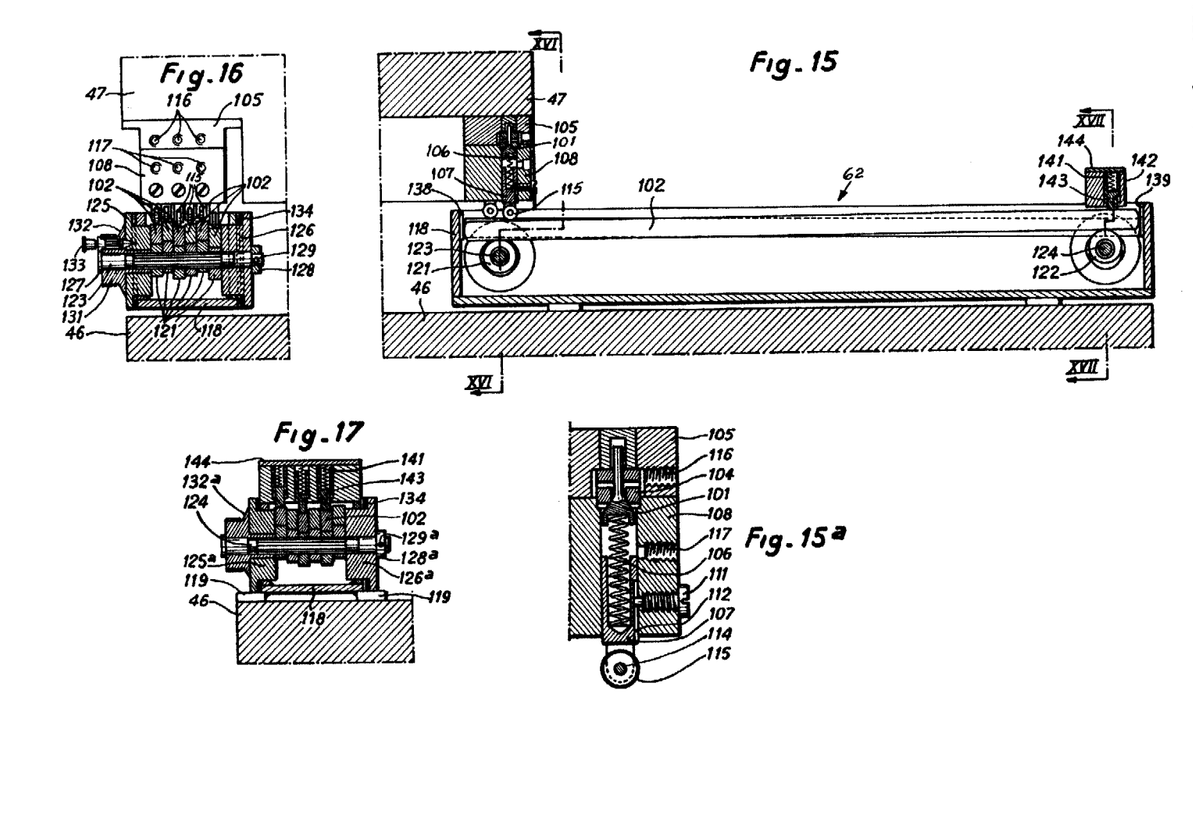
FIGURE 15 is a section on line XV—XV of FIGURE 14.
FIGURE 15a is a large-scale view of a detail of FIGURE 15.
FIGURE 16 is a section on line XVI—XVI of FIGURE 15.
FIGURE 17 is a section on line XVII—XVII of FIGURE 15.

As will be noted from FIGURES 14, 16 and 17, in this embodiment the six valve assemblies all similar to the one described are arranged in two sets of three in staggered formation within the valve housing 105—108, so that three of the inlet passages 116 all open from one side of housing section 105 while the remaining three inlet passages 116 all open from the opposite side of said housing section, a similar but reverse relationship applying to the outlet passages 117.

Each of the six camrails 102 in the illustrated embodiment is in the form of a bar having straight flat surfaces, adjustably supported at each of its ends so that both the bodily elevation of the camrail and its tilt angle to the horizontal plane can be varied. Specifically each of the bars 102 is supported adjacent its opposite ends upon one pair of cams in the sets 121 and 122 thereof, which may as shown be circular discs secured excentrically upon respective camshafts 123, 124. The setting of each cam on its shaft is made adjustable, for which purpose the camshafts may be formed with angularly spaced teeth or splines and the bore in each cam may be formed with complementary notches to provide for stepwise adjustment of the setting of each cam on its shaft. Camshaft 123 is journalled in spaced bearings 125, 126 within a casing 118 secured by way of flanges 119 or the like to the upper surface of the head 46. The shaft 123 is locked in axial position relative to its bearings by means of an enlarged head portion 127 on one end of the shaft and a stop-collar 128 and cotterpin 129 at its other end. The other camshaft 124 is similarly journalled in the bearings 125a and 126a in the casing 118.

The angular position of each of camshafts 123 and 124 is manually adjustable by rotation of a knurled knob 131 or 131a formed with a calibrated dial 132 or 132a. Spring detents 133, 133a are provided for resiliently locking each of the knobs 131, 131a in any selected angular setting.

All of the six cams such as 121 are arranged in stacked relationship on camshaft 123 and the six cams such as 122 are similarly stacked along the length of shaft 124. Spacer shims 134 are interposed between the side flanges of casing 118 and the respective bearings 126, 126a for adjusting the lateral clearance of the cams and camrails 102 engaged thereby. It will further be noted that each camrail 102 is retained in its proper longitudinal position by end abutments 138, 139 in the form of shims attached to the inner end walls of casing 118.

The valve springs 106 in addition to applying the pressure regulating valve members 101 against their seats 104 also serve to apply the camrails 102 against the cams 121 at one end of the camrails. At their opposite ends the camrails 102 are resiliently applied against the cams 122 by plungers 143 mounted in a casing 142 and pressed by springs 141 acting between the casing cover 144 and the plungers.

It will be clear from the foregoing that by a suitable positioning of the angular setting of each cam on its camshaft followed by a suitable angular adjustment of each camshaft through knobs 131, 131a it is possible to impart to each of the camrails 102 a selected over-all elevation and a selected slope angle so that the respective oil flow regulator valves of unit 62 will control the flow of oil to the associated slideway lubricator inlets in accordance with a desired function of the relative position of head 47 relative to slide 46, as modified if necessary by the presence of a milling attachment 69 on head 47, so that the respective pressures of oil provided in the paired inlets of each slideway will at all times offset any variations in the points of load application and thus maintain a uniform film of oil of predetermined thickness (e.g. $\frac{1}{100}$ mm.) between the mating surfaces of each slideway throughout the lengths of the latter, and consequent parallelism between the various relatively displaceable components of the machine-tool, as described with reference to FIGURES 1 to 8.

Conveniently, a schedule board 145 secured to a side of casing 118 or other suitable location indicates the angular positions that are to be imparted to knobs 131 and 131a in the various conditions of use of the machine. Indicia 146, 146a on the dials 125, 125a associated with knobs 132, 132a provided with pointers 147, 147a may correspond to similar indicia provided on the schedule board 145 to permit identification of the adjusted positions.

Figure 18:
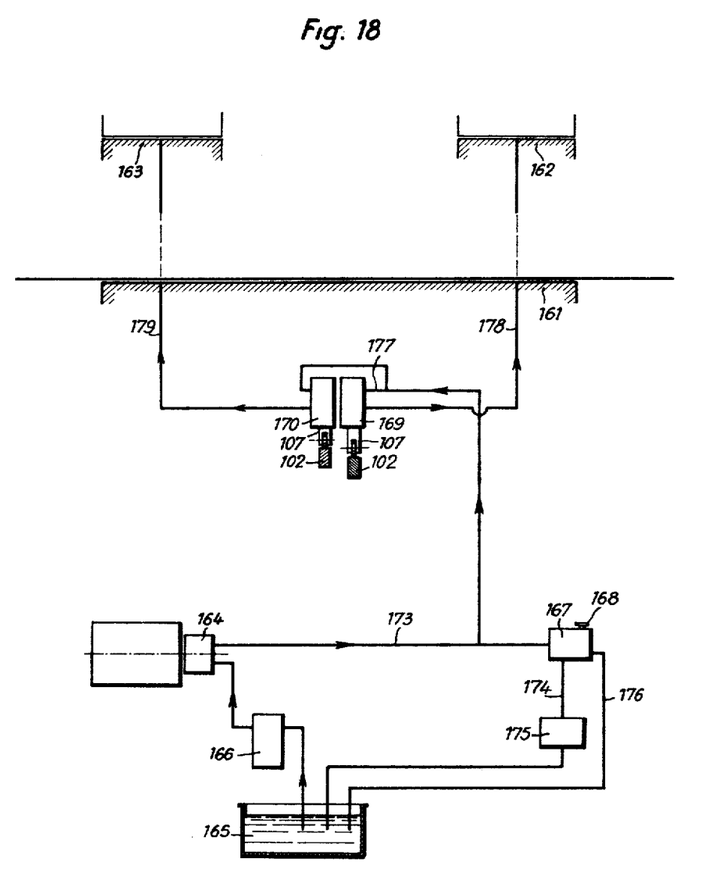
FIGURE 18 is a schematic flow circuit diagram illustrating a lubricant pressure regulating system in accordance with the invention including portions of the valve and valve adjusting means similar to those shown in the embodiment of FIGURES 13 to 17.

FIGURE 18 illustrates a schematic flow diagram of the system as a whole. There is shown one pair of mating slideway surfaces including a continuous slide surface 161 provided with two independent oil inlets, the layout being generally similar to the layout shown in FIGURE 5; and there is shown another pair of spaced mating slideway surfaces 162, 163 provided with independent oil inlets generally similar to the layout shown in FIGURE 8. The two spaced inlets associated with each slide surface 161 or 162—163, are connected by lines 178, 179 to the outlet passages (corresponding to outlet passage 117 shown in FIGURE 15a) of two respective pressure regulator valves here shown in outline and designated 169 and 170. The inlet passages (corresponding to 116 in FIGURE 15a) of both valves are supplied with pressure oil in parallel through conduit means 177 from a pressure source. The figure shows the previously mentioned plungers 107 projecting from the regulator valves and carrying follower rollers cooperating with the camrails 102, adjusted to different tilt angles and/or elevations.

The figure further shows the pressure source as comprising a pump 164 drawing oil through a strainer 166 from a sump 165 and delivering the oil under pressure through line 173 to the valve supply line 177 and through a branch line to a pressure regulator 167 having a calibrated pressure limiting valve 168 adjusted to a pressure value slightly higher than the maximum oil pressure that may be required in any of the slideways such as 161, 162, 163. The excess oil pressure above this limiting value is discharged by line 174 to sump 165, this discharge flow being advantageously usable as shown to provide lubrication for some ancillary mechanism 175. The small outflow from valve 168 is returned to the sump via line 176.

It will be apparent that while the embodiment described and illustrated attains the objects assigned to the invention, the latter may be embodied in a variety of other forms without exceeding the scope of the ensuing claims.

What I claim is:

1. In a machine-tool having a plurality of relatively displaceable components and interengaging slideway surface means on adjacent ones of said components, the distribution of loads on at least one of said slideway surfaces being variable with an operating condition of the machine-tool, the provision of spaced lubricator inlets delivering pressure lubricant to said one slideway surface, valve means for separately controlling the flow of lubricant to the respective inlets, and adjustable cam means connected to one of said components and responsive to the displaced position of one of said components for selectively adjusting said valve means to separately vary the flow of lubricant to the respective inlets to offset the variations in load distribution on said one slideway surface due to displacement of said displaced component.

2. In a machine-tool having a plurality of relatively displaceable components and interengaging slideway surfaces on adjacent ones of said components, the distribution of loads on at least one of said slideway surfaces being varied with the relatively displaced position of at least one of said components, the provision of spaced lubricator inlets delivering pressure lubricant to said one slideway surface, valve means for separately controlling the flow of lubricant to the respective inlets, and valve adjusting means connected to said one component and responsive to the displaced position thereof for separately varying the flow of lubricant to the respective inlets so as to offset the variations in load distribution on said one slideway surface due to displacement of said component.

3. The invention claimed in claim 2, wherein said valve adjusting means comprise cooperating camway and follower means respectively carried by said one component and by an adjacent component.

4. In a machine-tool having a base, a first part supported from and displaceable relative to the base on first slideway means in a first direction, a second part supported from and displaceable relative to the first part on second slideway means in a second direction, and a third part supported from and displaceable relative to the second part on third slideway means in a third direction, said third direction having a horizontal component whereby the load distribution on said slideway means is varied with the displaced position of said third part; the provision of at least one pair of spaced lubricator inlets for delivering pressure lubricant to each of said slideway means, the inlets in each pair being spaced in a general direction parallel to said horizontal component of said third direction; valve means for separately controlling the flow of lubricant to the respective inlets; and valve adjusting means connected to said third part and responsive to the displaced position thereof for adjusting said valve means to separately vary the flow of lubricant to the respective inlets of each pair so as to offset the variations in load distribution on the associated slideway means and maintain a substantially uniform resultant load thereon throughout the extent of each of said slideway means regardless of the displaced position of said third part.

5. The invention claimed in claim 4 wherein said first direction is horizontal, said second direction is vertical and said third direction is horizontal and normal to said first direction.

6. The invention claimed in claim 4 wherein said valve means are supported on said second part and said valve adjusting means comprise camway means carried by said third part and means engaging said camway means and operatively connected with said valve means for adjusting the opening thereof in accordance with the displacement of said third part.

7. In combination, a first machine part; a second machine part displaceable relative to the first part; and interengaging slideway surface means on both parts; at least one pair of spaced lubricator inlets connected with said surface means for delivering pressure lubricant thereto; a source of pressure lubricant; valve means connected between said source and each of said inlets; and cam means connected to one of said parts and responsive to the displaced position of said second part for adjusting said valve means to separately vary the flow of lubricant to the respective inlets to compensate for unbalanced load distribution over the extent of said slideway surface means due to the displacement of said second part and maintain a substantially uniform film of lubricant throughout said slideway surface means.

8. In combination, a first machine part; a second machine part displaceable relative to the first part and a pair of slideways on one of said parts spaced transversely to the direction of said displacement; a lubricator inlet connected with each slideway; a source of pressure lubricant; a valve connected between said source and each inlet; and cam means connected to one of said parts and responsive to the displaced position of said second part for adjusting said valves to separately vary the pressure of lubricant delivery to each slideway to compensate for unbalanced load distribution between the two slideways due to the displacement of said second part and maintain substantially equal films of lubricant as between both slideways.

9. In a machine including slideway means and having a machine part displaceable relative to another part in a direction having a horizontal component thereby to vary the load distribution applied to said slideway; and a source of pressure lubricant; the improvement comprising a plurality of lubricator inlets to said slideway means displaced generally parallel to said horizontal component; an equal plurality of valves carried by one of said parts and connected to control lubricant flow from said source to each of said inlets; an equal plurality of camways carried by the other one of said parts and extending in a general direction parallel to the direction of displacement of said first relative to said second part; cam followers engaging the respective camways and connected for actuating the respective valves to control the flow of lubricant to the respective inlets; and means for selectively adjusting the position of each camway relative to the associated follower.

10. The invention claimed in claim 9, wherein said adjusting means include means for adjusting the angular position of each camway relative to the associated follower.

11. The invention claimed in claim 9 wherein said adjusting means include means for separately adjusting the position of each end of the camway so as to adjust both the angular position of each camway relative to the associated follower and the over-all distance of each camway from said follower.

12. The invention claimed in claim 11, wherein said end adjusting means comprise a pair of rotatable cams engaging the respective ends of each camway.

13. The invention claimed in claim 12, wherein all the cams engaging corresponding one ends of all said camways are secured on a common first camshaft journalled in said other part and all the cams engaging corresponding opposite ends of all said camways are secured on a common second camshaft journalled in said other part.

14. The invention claimed in claim 13, wherein each cam is adjustably settable on its camshaft.

15. The invention claimed in claim 12, including spring means applying said camways against the associated cams.

16. The invention claimed in claim 9, including spring pressed plunger means interposed between said valves and cam followers.

17. In combination, a first machine part, a second machine part slidably displaceable relative to said first part, interengaging slideway surface means on said parts and at least two lubricator inlets connected with said surface means for delivering pressure lubricant thereto, a source of pressure lubricant, valve means for controlling the flow of lubricant from said source to said inlets, and means for controlling said valve means to cause the latter to vary the pressures at which the lubricant is delivered through said inlets to said surface means to compensate for variations in the load distribution on said slideway surface means due to the displacement of said second part from a previous position, said controlling means including means connected to one of said parts and operable in response to the displacement of said second part to cause said controlling means to adjust said valve means to vary the distribution of the lubricant delivered through said inlets in proportion to the differences of load pressure resulting from such displacement so as to maintain the thickness of the lubricant between said slideway surface means substantially constant.

18. A combination such as defined in claim 17, in which said operable means of the controlling means connected to one of said parts is constructed and arranged to cause said controlling means to adjust said valve means to furnish the lubricant through each of said inlets to said slideway surface means at a plurality of given pressures each dependent on the position of said second part relative to said first part throughout the range of movement of said second part.

19. In combination, a first machine part, a second machine part slidably displaceable relative to said first part, interengaging slideway surface means on said parts and a plurality of spaced lubricator inlets connected with said surface means for delivering pressure lubricant throughout the extent of said surface means, a source of pressure lubricant, valve means for controlling the flow of lubricant from said source to said inlets, and means for controlling said valve means to cause the latter to vary the pressure at which the lubricant is delivered through each of said inlets to said surface means to compensate for unbalanced load distribution over the extent of said slideway surface means due to the displacement of said second part from a previous position, said controlling means including means connected to one of said parts and operable in response to the displacement of said second part to cause said controlling means to adjust said valve means to vary the pressure of the lubricant delivered through each of said inlets in proportion to the difference of load pressure on its associated part of said slideway surface means resulting from such displacement to maintain a substantially uniform film of lubricant throughout the extent of said slideway surface means.

References Cited in the file of this patent

UNITED STATES PATENTS

| 2,646,651 | Wilson | July 28, 1953 |
| 2,788,862 | Langer | Apr. 16, 1957 |
| 2,869,933 | Bissinger | Jan. 20, 1959 |

FOREIGN PATENTS

| 771,892 | Great Britain | Apr. 3, 1957 |
| 331,637 | Switzerland | Sept. 15, 1958 |

UNITED STATES PATENT OFFICE
CERTIFICATE OF CORRECTION

Patent No. 3,109,514            November 5, 1963

René Deflandre

It is hereby certified that error appears in the above numbered patent requiring correction and that the said Letters Patent should read as corrected below.

Column 9, line 38, for "distribution" read -- pressures --.

Signed and sealed this 16th day of June 1964.

(SEAL)
Attest:

ERNEST W. SWIDER
Attesting Officer

EDWARD J. BRENNER
Commissioner of Patents